United States Patent
Grosgeorge

(10) Patent No.: US 12,033,350 B2
(45) Date of Patent: *Jul. 9, 2024

(54) GROUND CONTROL POINT CENTER DETERMINATION

(71) Applicant: Skydio, Inc., Redwood City, CA (US)

(72) Inventor: Damien Grosgeorge, Paris (FR)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,982

(22) Filed: Dec. 13, 2022

(65) Prior Publication Data
US 2023/0186511 A1 Jun. 15, 2023

Related U.S. Application Data

(63) Continuation of application No. 17/206,031, filed on Mar. 18, 2021, now Pat. No. 11,557,057, which is a continuation of application No. 15/971,470, filed on May 4, 2018, now abandoned.

(60) Provisional application No. 62/501,401, filed on May 4, 2017.

(51) Int. Cl.
| | |
|---|---|
| *G06T 7/73* | (2017.01) |
| *G06V 10/82* | (2022.01) |
| *G06V 20/13* | (2022.01) |
| *G06V 20/17* | (2022.01) |
| *G01C 11/00* | (2006.01) |

(52) U.S. Cl.
CPC ............ *G06T 7/73* (2017.01); *G06T 7/74* (2017.01); *G06V 10/82* (2022.01); *G06V 20/13* (2022.01); *G06V 20/17* (2022.01); *G01C 11/00* (2013.01); *G06T 2207/30204* (2013.01)

(58) Field of Classification Search
CPC .. G06T 7/30; G06T 7/33; G06T 7/337; G06T 7/70; G06T 7/73; G06T 7/74; G06T 2027/30181; G06T 2207/30184; G06T 2207/30204; G06V 20/13; G06V 20/17; G06V 20/176; G01C 11/00; G01C 21/00; G08G 5/0069
See application file for complete search history.

(56) References Cited

U.S. PATENT DOCUMENTS

| | | | |
|---|---|---|---|
| 11,557,057 B2 * | 1/2023 | Grosgeorge | .......... G06T 7/73 |
| 2017/0259912 A1 | 9/2017 | Michini et al. | |
| 2018/0204469 A1 | 7/2018 | Moster et al. | |
| 2019/0205610 A1 | 7/2019 | Muehlfeld et al. | |

* cited by examiner

*Primary Examiner* — Andrew W Johns

(57) ABSTRACT

Methods, systems and apparatus, including computer programs encoded on computer storage media for determining a center location of a ground control point used in aerial surveys. Machine learning models are used to identify in digital images pixel coordinates of the ground control point identified in the digital images. These image pixel coordinates are used in photogrammetric processing and software.

20 Claims, 7 Drawing Sheets

GROUND CONTROL POINT CENTER DETERMINATION

CROSS-REFERENCE TO RELATED APPLICATION(S)

This application is a continuation of U.S. patent application Ser. No. 17/206,031, filed Mar. 18, 2021, which is a continuation of U.S. patent application Ser. No. 15/971,470, filed May 4, 2018, which claims the benefit of U.S. Provisional Patent Application No. 62/501,401, filed May 4, 2017, the entire disclosures of which are hereby incorporated by reference.

BACKGROUND

Unmanned Aerial Vehicles (UAVs) are used to obtain aerial images of a site or of a location. Ground control points are often used during an aerial inspection to help identify a geo-spatial location in the images for photogrammetric processing. The geo-spatial location of the ground control point, also referred to as a target, is used by photogrammetric processes and software to render composite and 3-dimensional geo-rectified imagery based on the aerial images. The ground control points serve as a geo-spatial reference to ensure that the aerial images are correctly positioned and aligned to a geo-spatial coordinate system.

Detecting these ground control points in the acquired images is a time consuming manual process. Moreover, manual identification of the ground control points is challenging due to differences in the conditions of acquisition of the images by the UAV. For example, the altitude of the UAV varies when obtaining images which means the size of the target in pixels is different among the images. This is often due to GPS signal variation such that the UAV does not maintain a fixed distance above the ground surface when obtaining images. Differences in UAV sensors or changing weather results in high variability in the luminosity or contrast between ground control points across sites, or for a given site across a number of survey flights. Digital images taken by a moving UAV may results in blurred or deformed images of the ground control points. Sometimes ground control points are permanently installed, for example for repeated surveys. Sometimes occlusions may occur between the surveys, for example vegetation may grow over an installed ground point, the ground control point may be made of a material that rusts, or deteriorates, the target becomes covered in dirt, etc.

SUMMARY

Particular embodiments of the subject matter described in this specification can be implemented so as to realize one or more of the following advantages.

In general, one innovative aspect of the subject matter described in this specification can be embodied in methods and systems that include receiving a geo-spatial location of ground control points that were placed on the surface of the ground for use in an aerial survey; performing the aerial survey with an unmanned aerial vehicle (UAV), wherein the UAV obtains multiple aerial images including images of each ground control point, the aerial images having an associated geo-spatial location of where each image was obtained; receiving the aerial images obtained by the UAV; creating a set of images for each ground control point; extracting a pixel coordinate of the ground control point in each of the images; and generating a dataset including the pixel coordinate identifying the center location of a ground control point found in the image.

In general, another innovative aspect of the subject matter described in this specification can be embodied in methods and systems that include receiving a set of images, the images having been obtained by an unmanned aerial vehicle, the images describing an aerial view of a real-world location, the images including a depiction of two or more ground control points, the ground control points depicted in the images having an identifiable pattern; determining a group of images related to a respective ground control point; and for a determined group of images, evaluating whether a pixel cluster includes a ground control point, and identifying in the images a pixel location for a ground control point in the image.

In another innovative aspect of the subject matter described in this specification can be embodied in the methods and systems that include training an image classifier with a first set of images, the first set of images depicting examples of ground control points including exemplary target classes, and exemplary outlier classes; receiving a second set of digital images, the images having been obtained by an unmanned aerial vehicle (UAV), the images describing an aerial view of a real-world location, the images including a depiction of one or more ground control points, the ground control points depicted in the images having an identifiable pattern; applying the visual classifier to the second data set of images, and determining the occurrence of a ground control points in an image; and determining a pixel location of the center of the determined ground control points in the second data set of images, wherein the pixel location is an image coordinate of the center of the ground control point.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
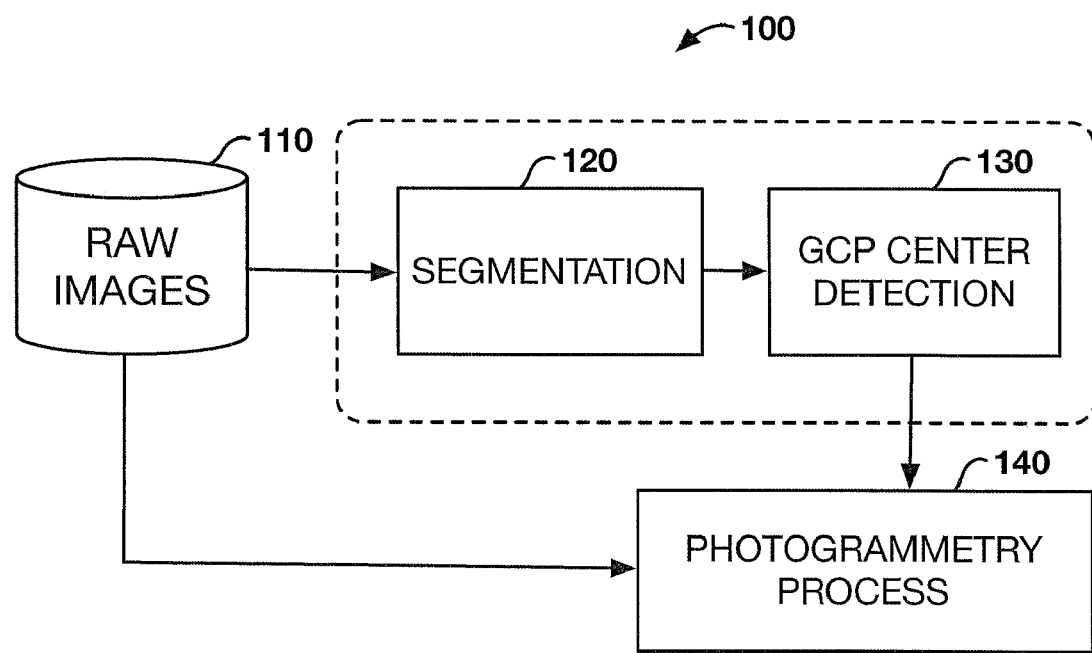
FIG. 1 is a block diagram illustrating the process of ground control point center detection.

Ground control points (also referred to as GCPs, or targets) are used in conjunction with an aerial inspection of a site, where an unmanned aerial vehicle (UAV) obtains aerial images of the site. The ground control points are typically mats, or targets, with a pattern displayed on a top portion of the ground control point. Ground control points are placed about multiple locations of a site that will be surveyed by the UAV. A ground control point has an identifiable pattern, and may be of different shapes or sizes, for example a square target with a dimension of 1 meter by 1 meter with a white and red (or white and black) checkered pattern. During an inspection or survey of the site by the UAV, the UAV obtains multiple digital images, some of which include a depiction of the ground control points placed about the site. Several ground control points are often needed for a site to obtain optimal results in subsequent photogrammetric processing. The number of targets depends on the overall area or size of the site.

The physical location of the center of each ground control point after it has been placed on the ground is manually measured. The center location of a ground control points is measured, for example by a topographer utilizing traditional surveying equipment to obtain the geo-spatial coordinates of the center of the ground control point. Location measurement may be accomplished using survey equipment, such as RTK (Real-time Kinematic), PPK (Post Processed Kinematic) survey equipment, or other geo-spatial location measuring equipment. A geospatial coordinate is identified for each ground control point center use in the site survey. Optionally, electronic ground control points may be used where the ground control point includes onboard location determination circuitry, such as GPS or GNSS receiver, that will measure the location of the ground control point. The coordinates of the ground control point may be obtained by the ground control point itself, and transmitted to another system for processing. This measured location is the actual real-world location of the physical center of the ground control point.

The processes and systems described herein detects the center of the ground control points in the images acquired by the UAV and determines a center of the ground control point in an image, and determines a pixel coordinate of the location of the center of the ground control point depicted in an image. The system captures by user interface input the respective geo-spatial coordinates of the ground control points used in the survey. Alternative embodiments allow for the receipt of the of the ground control point geo-spatial coordinate via system-to-system interfaces, or application program interface functions. The geo-spatial coordinates are cross-referenced to the pixel coordinates determined by the system. The measured geo-spatial locations of the ground control points are associated with sub-pixellar pixel coordinates in a digital image. This automatic association significantly improves photogrammetric processing by allowing photogrammetric software, such as Agisoft (or any other photogrammetric software or processes), to rely on real hard points (i.e., the determined pixel coordinates of the GCPs) in the images.

Referring to FIG. 1, the figure illustrates a block diagram of the process 100 of ground control point center determination. Generally, the system receives aerial images 110 obtained by a UAV during an inspection. The aerial images include a depiction of ground control points used during the survey. The ground control points include a particular pattern on the top of the ground control point. In one embodiment, the received aerial images are segmented into groups 120. Each grouping of the aerial images relate to a particular ground control point. The system identifies the center location of a ground control point in each of images in the respective group of images 130. The system determines a pixel coordinate indicating the center of the ground control point depicted in an image. The pixel coordinates of the center of the ground control points found in the images are associated with the real-world measure geo-spatial location of the respective ground control points. The pixel coordinates (of the center of the ground control point) for each image and the geo-spatial locations of the ground control point are provided to a photogrammetry process or software for further processing 140. The pixel coordinates may be provided to external software or systems, via various mechanism such as, direct data feeds, output file, database storage and retrieval, via system function calls, and so forth.

Figure 2:
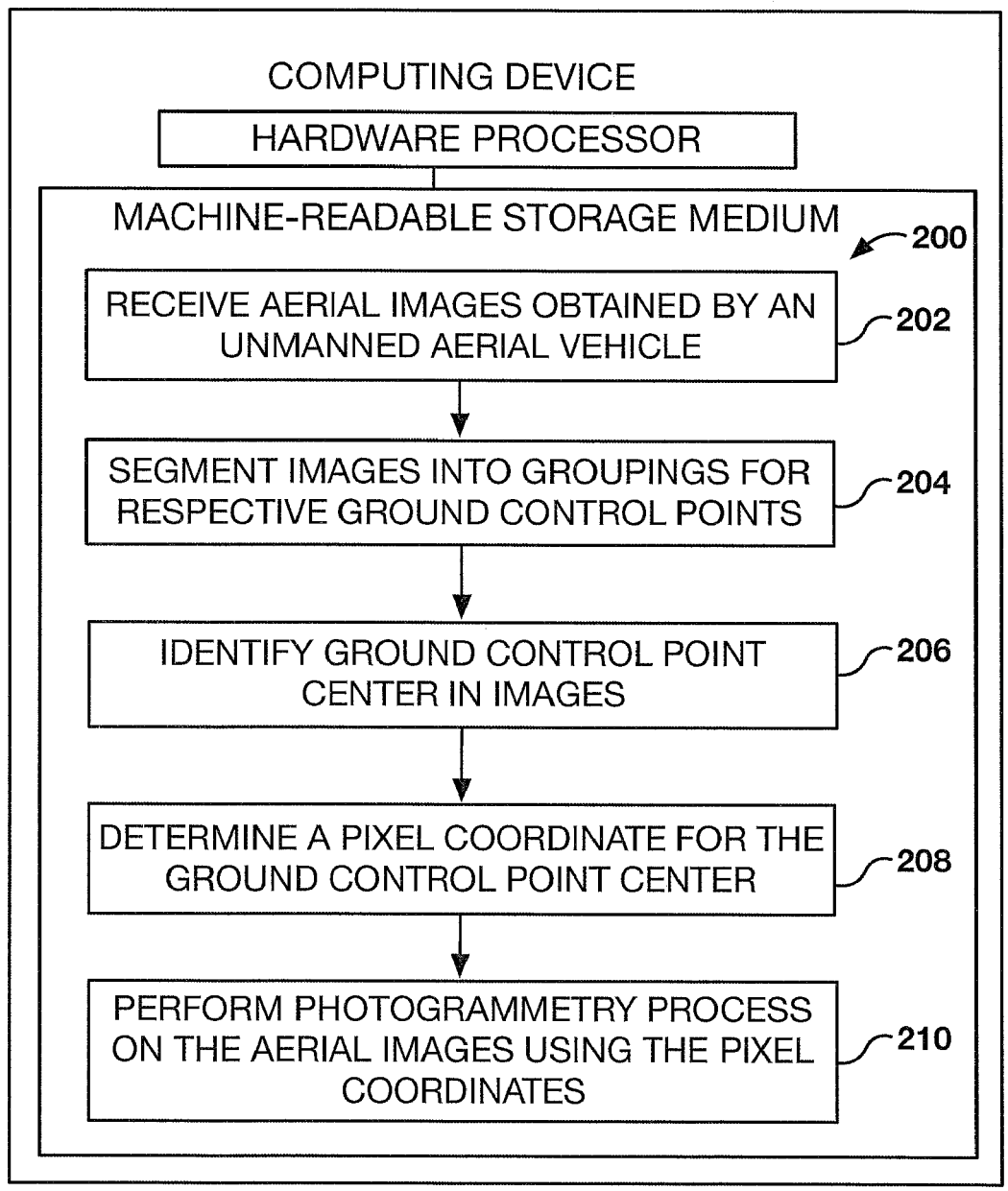
FIG. 2 is a block diagram of an example process for determining the center of a ground control point in images.

Referring to FIG. 2, the figure illustrates a block diagram further illustrating the process 200 for determining the center of a ground control point in aerial images. In step 202, the system receives aerial images obtained by an unmanned aerial vehicle. The aerial images are digital images that depict one or more ground control points, and other depictions of the inspection area. In step 204, the image files are segmented (e.g., grouped together) based on whether the image is related to a particular ground control point. While the segmentation is used to assist with efficiency of analysis, the segmentation is not always needed, and can be omitted in different embodiments. In step 206, the grouped images are processed to identify the center location of a ground control point depicted in the image. In step 208, a pixel coordinate for the center of the ground control point is determined. As discussed herein, the ground control point center determination utilizes a machine learning model to assist in detecting the ground control point centers. In step 210, a photogrammetry process is performed on the aerial images using the identified pixel coordinates in the images. The photogrammetry process uses the pixel coordinates, and the associated geo-spatial locations of the ground control points to generate any of a geo-rectified imagery, composite imagery, 3d mesh, point clouds utilizing the aerial image.

Physical Ground Control Point Placement and Measurement

Each of the ground control points used in the aerial survey are assigned a unique identifier, such as GCP_RP_1, GCP_RP_2, GCP_RP_3. The values for the real-world measured locations of the centers of each ground control point is received by the system. If the three ground control points, GCP_RP_1, GCP_RP_2, and GCP_RP_3 were used for the aerial survey, then measured location values (e.g., latitude, longitude, altitude; or easting, northing, altitude) would have been obtained for each ground control point.

The system may receive a data file including data values for the measured locations of the ground control points. Optionally, the system may provide a user interface allowing input of the respective locations for each of the ground control points. A ground control station used to perform the aerial inspection with the UAV, for example, may include a user interface that allows input of the name of the respective ground control points used for the aerial inspection, and the measured geospatial location of each of the respective ground control points. The user interface may present a list of predefined ground control point names or identifiers. For example, if an operator repeatedly uses the same ground control points, the user interface facilitates faster input for the locations of the ground control points. A particular ground control point may be selected, and the particular geo-spatial coordinates of the ground control point may be added by the operator. The coordinates are then stored into memory, or into a database, or other non-transitory storage mediums. The images obtained by the UAV, along with the ground control point location information may be used for photogrammetry processing on the ground control system, and/or the images may be sent to a separate system, such as a cloud-based system for photogrammetry processing. The processing may even occur on the UAV itself if the UAV is equipped with one or more processors capable of analyzing the images, and utilizing a visual classifier/machine learning model discussed herein.

The following Table 1 illustrates exemplary location data for a representative set of ground control points.

TABLE 1

| GCP_Name | Easting | Northing | Altitude |
|---|---|---|---|
| GCP RP 1 | 772087.024267098 | 196919.8460445578 | 165.921 |
| GCP RP 2 | 771541.8754530225 | 196792.2805006152 | 191.921 |
| GCP RP 3 | 771728.7478590722 | 196979.76623894554 | 178.479 |
| GCP RP 5 | 772282.1399170188 | 196714.09003024385 | 214.467 |
| GCP RP 6 | 772895.8199625898 | 16702.4584240558 | 230.458 |

Table 1 includes data for the locations of each ground control point used for an aerial inspection. The field GCP_Name is an identifier for a particular ground control point.

TABLE 2

| Image File | Easting | Northing | Altitude | Yaw | Pitch | Roll |
|---|---|---|---|---|---|---|
| path/IMG_3255.JPG | −722049.2448303162 | 196616.22686497952 | 334.0203208878 | 85.6909637451 | 8.9881019592 | 3.0636439323 |
| Path/IMG_3256.JP | 722085.3186365298 | 196624.35239559863 | 336.2826499894 | 63.0578117371 | 7.8344402313 | −2.9234497547 |
| Path/IMG 3257.JPF | 77213.2673418169 | 199631.64817414302 | 337.0344810441 | 75.3115081787 | 6.0866703987 | 4.5698814392 |

The fields Easting and Northing are geographic Cartesian coordinates for the measured center location of the ground control point. Easting refers to eastward-measured distance. Northing refers to the northward-measured distance. The Altitude is the measured altitude of the ground control point. Different geo-spatial coordinate systems may be used.

UAV Performs Aerial Survey

Figure 3:
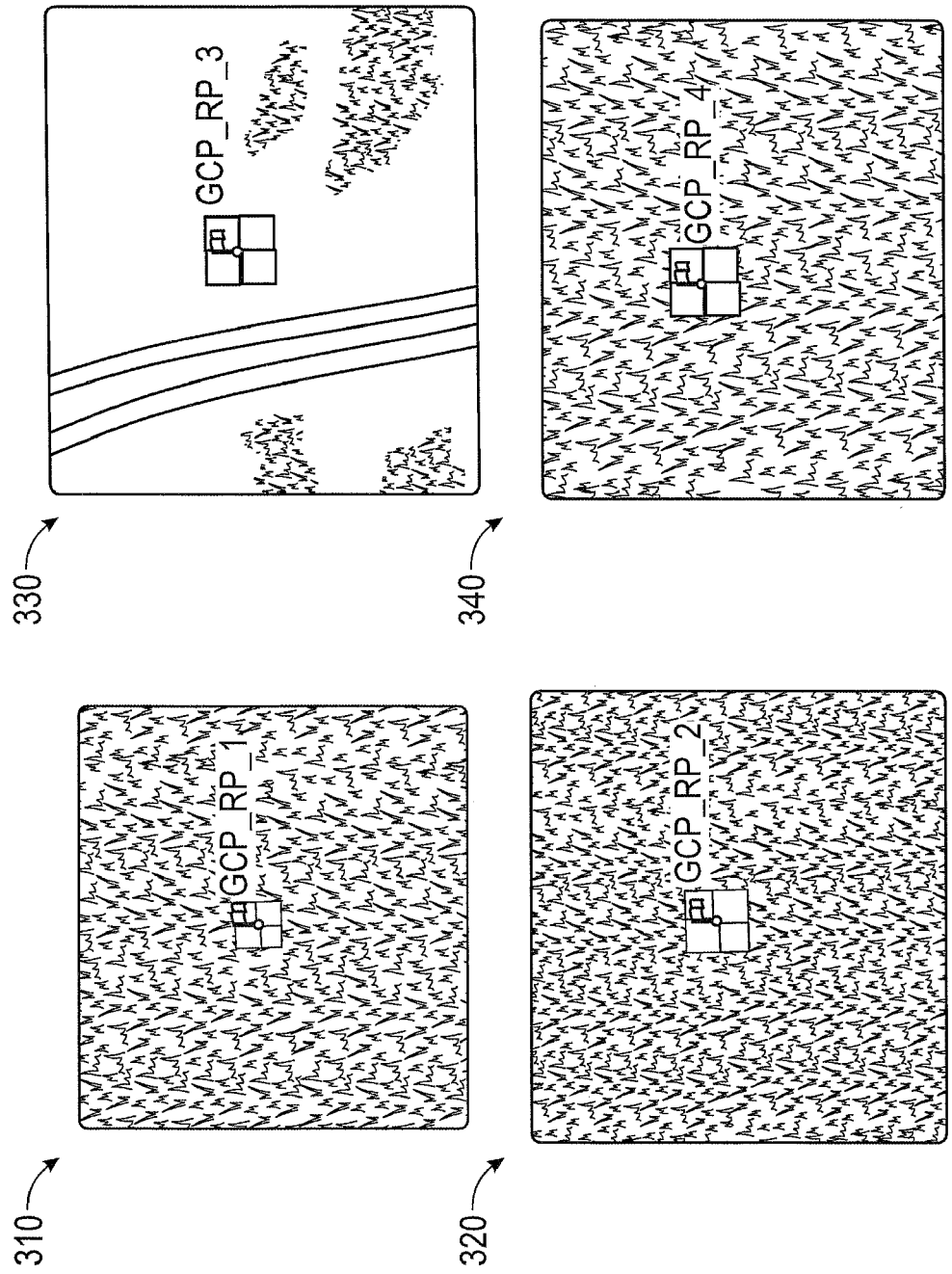
FIG. 3 illustrates images with ground control points with identified centers.

A UAV performs an aerial survey of a site, and obtains digital images depicting an aerial view of the site. The aerial survey may be performed, for example, based on a predetermined flight plan where the UAV navigates to multiple locations over a site, and obtains multiple images of the site. These images would include depictions of the ground control points placed about the site. FIG. 3 illustrates images of ground control points placed about a location. As an example, images obtained by the UAV would include a depiction of ground control points GCP_RP_1 310, GCP_RP_2 320, and GCP_RP_3 330 and GCP_RP_4 340. While the UAV is performing an aerial survey, the UAV conducts a flight plan or path over the site and obtains digital images of the site. At different locations in the air, the UAV obtains digital images describing the site. Either a digital camera connected to the UAV, or the UAV itself, records a geo-spatial location of where an image is taken. The geo-spatial coordinate is recorded for each image, for example a GPS coordinate of the location of the UAV when the image was taken. The GPS coordinates may include latitude/longitude values and an altitude value of the UAV. The coordinates may be in various formats such as in WGS84 (EPSG 4326) projection systems. Additionally, the yaw, pitch and roll of the UAV is logged when the UAV triggers the digital camera to take an image. Additional information may be logged by the UAV. The yaw, pitch, and roll values of the UAV are later used by the system to determine the pose or attitude of the UAV when the UAV obtained or captured a particular image.

The images, and related metadata, obtained by the UAV are received by the system for processing. The aerial digital images, and associated UAV and image metadata, may be sent in real time to a ground control station performing the aerial survey, or directly to a separate processing system.

A metadata file may be obtained from the UAV. This data may also be transmitted by the UAV, and received wirelessly by the ground control station utilized to navigate the UAV. Additionally, this information may be transmitted and received by another separate system, such as a cloud or Internet connected system, that may receive the images and log and telemetry data from the UAV, either directly, or indirectly through a ground control station system. This file or data log data where the UAV store metadata when a digital photo is taken by the UAV during an inspection or aerial survey. In an exemplary embodiment, the file includes an image file name, and path of the image (full path not shown below), the geo-spatial coordinate of the UAV when the image was taken (e.g., easting, northing and altitude, and/or latitude, longitude, and altitude), and the orientation of the UAV (yaw, pitch and roll), and a code of the particular sensor used for taking the photo (not shown below).

Table 2 describes an exemplary metadata file. The field Image File describes the particular digital image taken by the UAV. For example, the UAV may have taken images IMG_3255.jpg, IMG_3256.jpg and IMG_3257.jpg. In this example, the images are of a jpeg format. The image is stored on a file system, or in memory. The field Easting is the easting location of where the image was taken. The field Northing is the northing location of where the image was taken. The field Altitude is the altitude of where the image was taken. The field Yaw is the yaw value of the UAV, the field Pitch is the pitch value of the UAV, and the field Roll is the roll value of the UAV.

The metadata obtained from the UAV may include longitude and latitude coordinate values. The geo-spatial coordinate values may be transformed into another coordinate system, Easting/Northing values may be transformed into Latitude/longitude coordinates, and vice versa.

Deep Learning Model

The system may utilize one or more visual classifiers, computer vision algorithms, deep learning models to determine the center of a ground control point found in an image. For example, images of ground control points may be used to train, or update a deep learning model or visual classifier. A deep learning model, or machine learning algorithm, may previously trained with images indicating ground control points. The system may be in communication with a classifier information database (e.g., one or more databases, or a storage subsystem) that can store one or more machine learning models, such as support vector machines, k-means clustering, neural networks, and so on. The system includes various databases that includes results of analyzed training datasets.

To detect ground control points in an image, targets may be modeled using a machine learning model (such as a deep learning model). The purpose of this model is (i) to identify a target, and (ii) to determine the center of the target. To create such a model, one defines a number and nature of classes, and a size of the model.

For the number and the nature of classes, in one embodiment, two classes may be defined: the target class and the outlier class. To obtain the center of the target from the model, only centered targets are considered as targets. The target class would be trained with a particular pattern of ground control points. The overall model may be changed to include detection of different types of ground control point patterns. Allowing for multiple patterns may require the creation of multiple target classes, for each unique pattern.

To train the model the size of the set of images representing targets and outliers is defined. The outlier class represents images that would not include a target (i.e., a ground control point). Considering common height of flight during an aerial inspection an optimal defined pixel area size was determined to be a size of 28 by 28 pixels. The pixel area size may be increased or decreased based on a height of or above ground altitude of the UAV. The pixel area size is used for the tensor using the TensorFlow system as discussed below. The TensorFlow system provides computations which may be represented as graphs. A tensor is a typed multi-dimensional array.

Training database. A training database may be used in conjunction with the system and process. The training database allows the model to learn by giving it examples of each class (for, example 28 by 28 pixel samples of the targets or outliers). For training, digital images (e.g., an aerial image taken by a UAV) that includes a target, a sub-image of the target is extracted for the desired pixel area size (of size 28 by 28 pixels, the center of the sub-image is the center of the target) and then augmented (meaning using this sub-image, various other sub-images are created by modifying contrast, luminosity and rotation). For instance, different rotations may be used, and in combination with some values of contrast and luminosity (adaptive values, considering sub-image intensities). With these various combinations, a particular instance of a target, may generate hundreds of variations of the target for use in training the model. Augmentation is performed to (i) add variability to the raining database, and (ii) create a balanced database (as many target as outlier samples) with enough outlier images.

Testing Database. A testing database allows the model to be validated by giving it unknown data and evaluating whether or not the model is producing the correct answer, considering the input (target or outlier). The testing may be composed of hundreds to thousands of target samples and outlier samples.

Architecture for the Deep Learning Model. To achieve valid results, it is important that the model be well defined. In an embodiment, a model was composed of 2 convolutional layers (64 filters in each), then a convolutional layer with a stride of 2 (128 filters), then 3 convolutional layers (128 filters), then a convolutional layer with a stride of 2 (256 filters), then a fully connected with 1024 neurons and no dropout, then a fully connected with 2 neurons and a dropout of 0.5 (note that this is the output: 2 outputs, one for target class, one for outlier class). A library was created to train the model, and was based on the Tensorflow library.

The exemplary model was trained during 15 epochs (meaning the model saw each image of the training database 15 times).

Figure 4A:
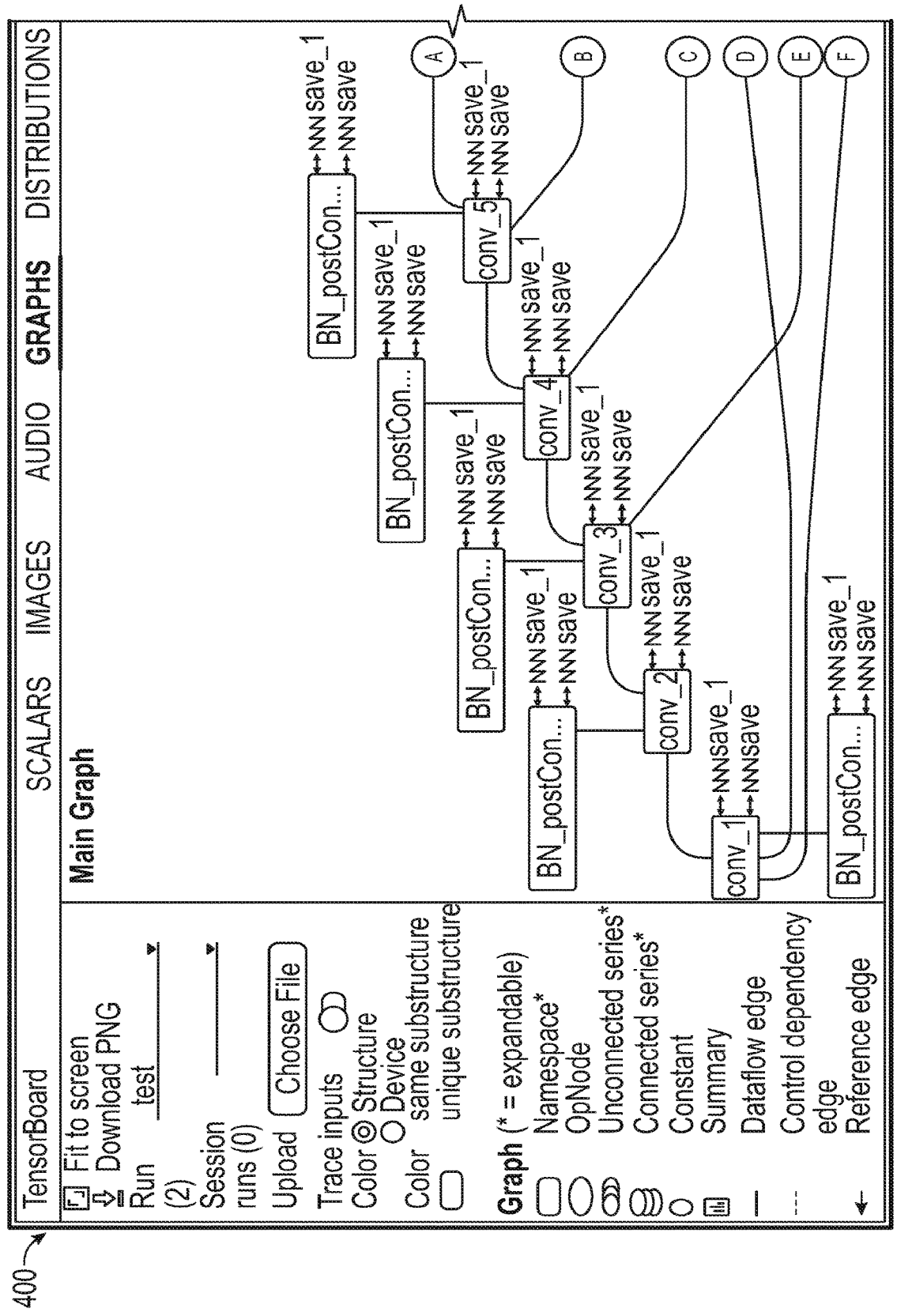
FIGS. 4A-4B are diagrams illustrating a TensorFlow graph.
Figure 4B:
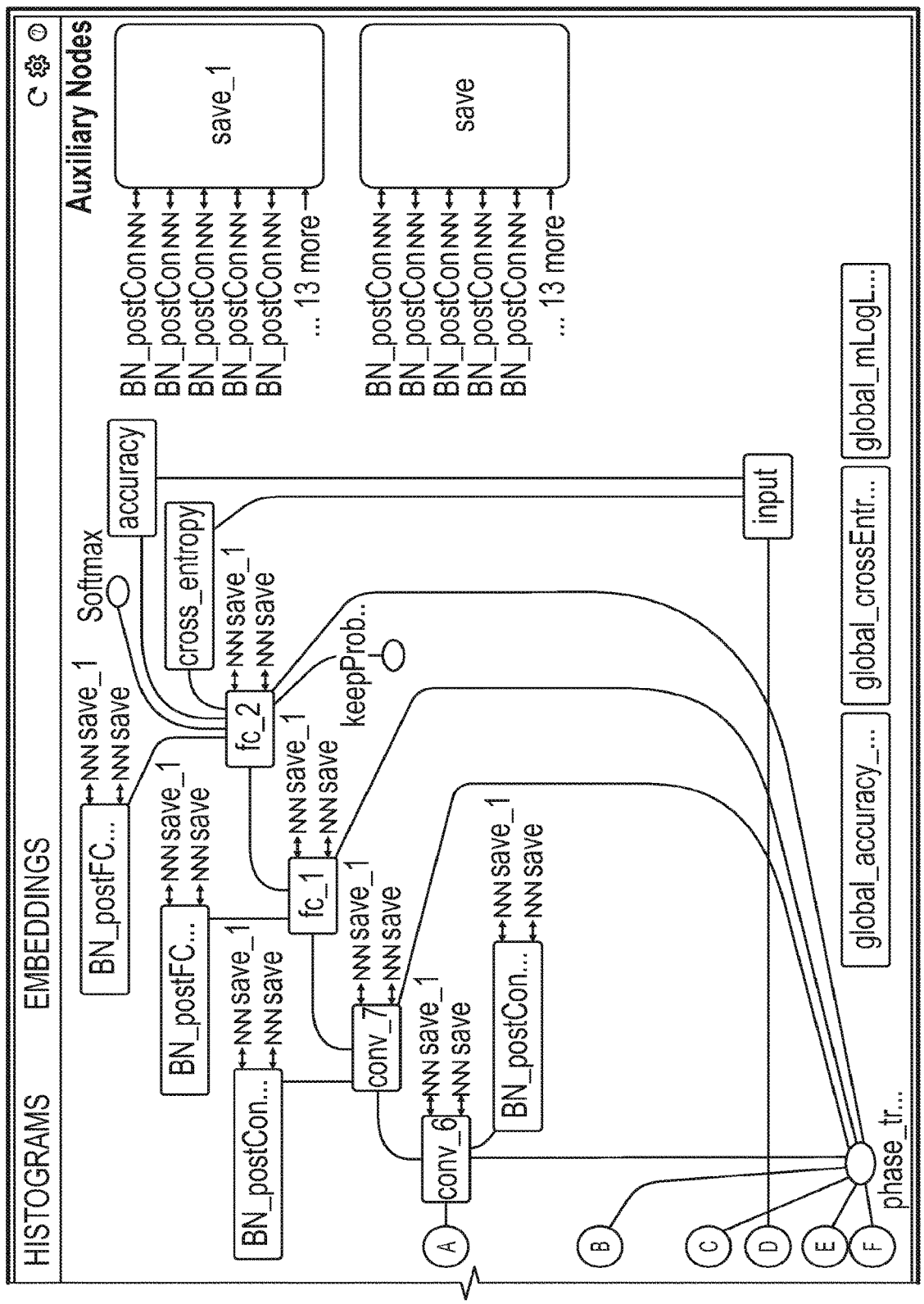
Figure 5A:
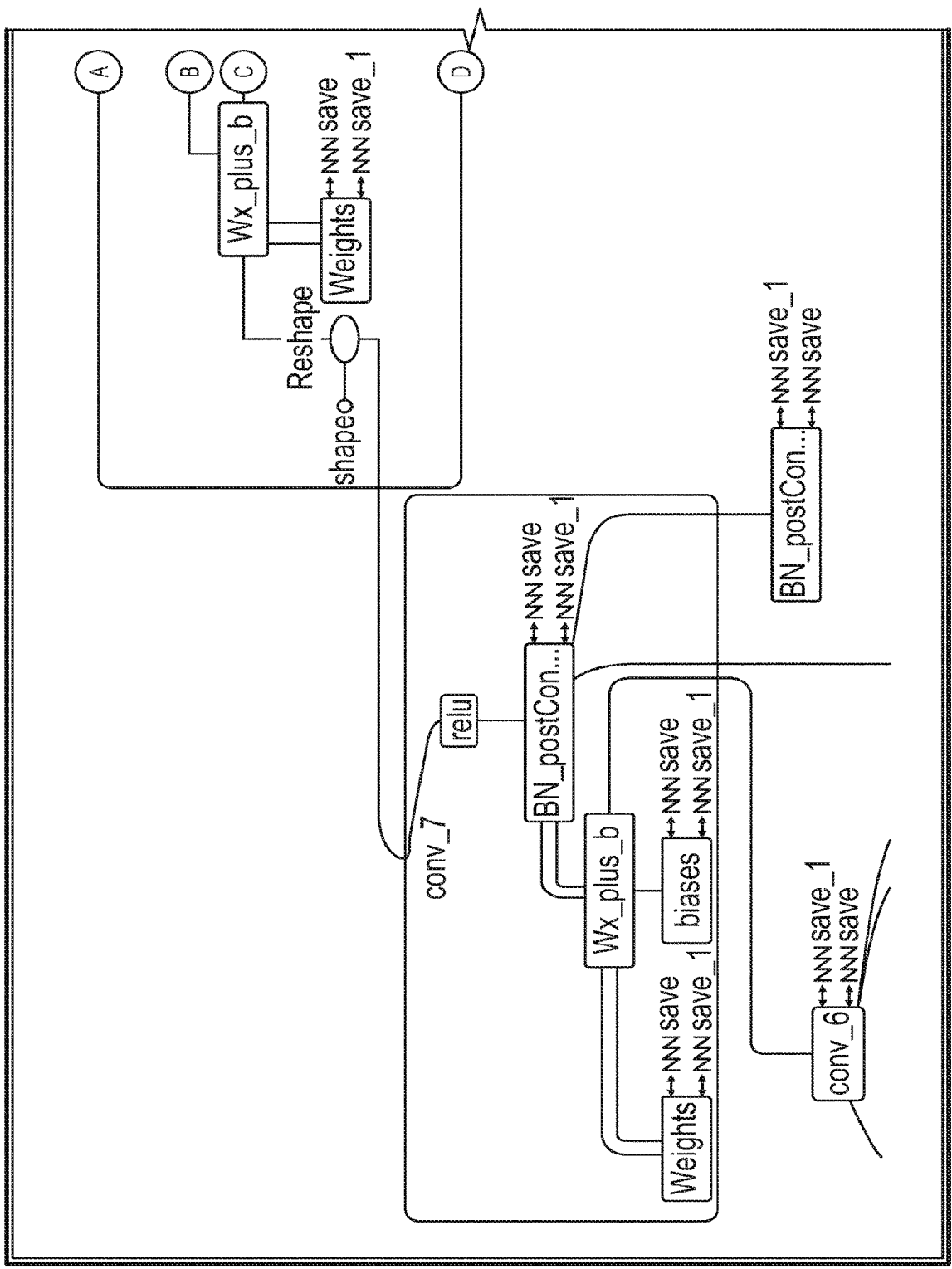
FIGS. 5A-5B are diagrams illustrating a detailed section of the graph of FIGS. 4A-4B.
Figure 5B:
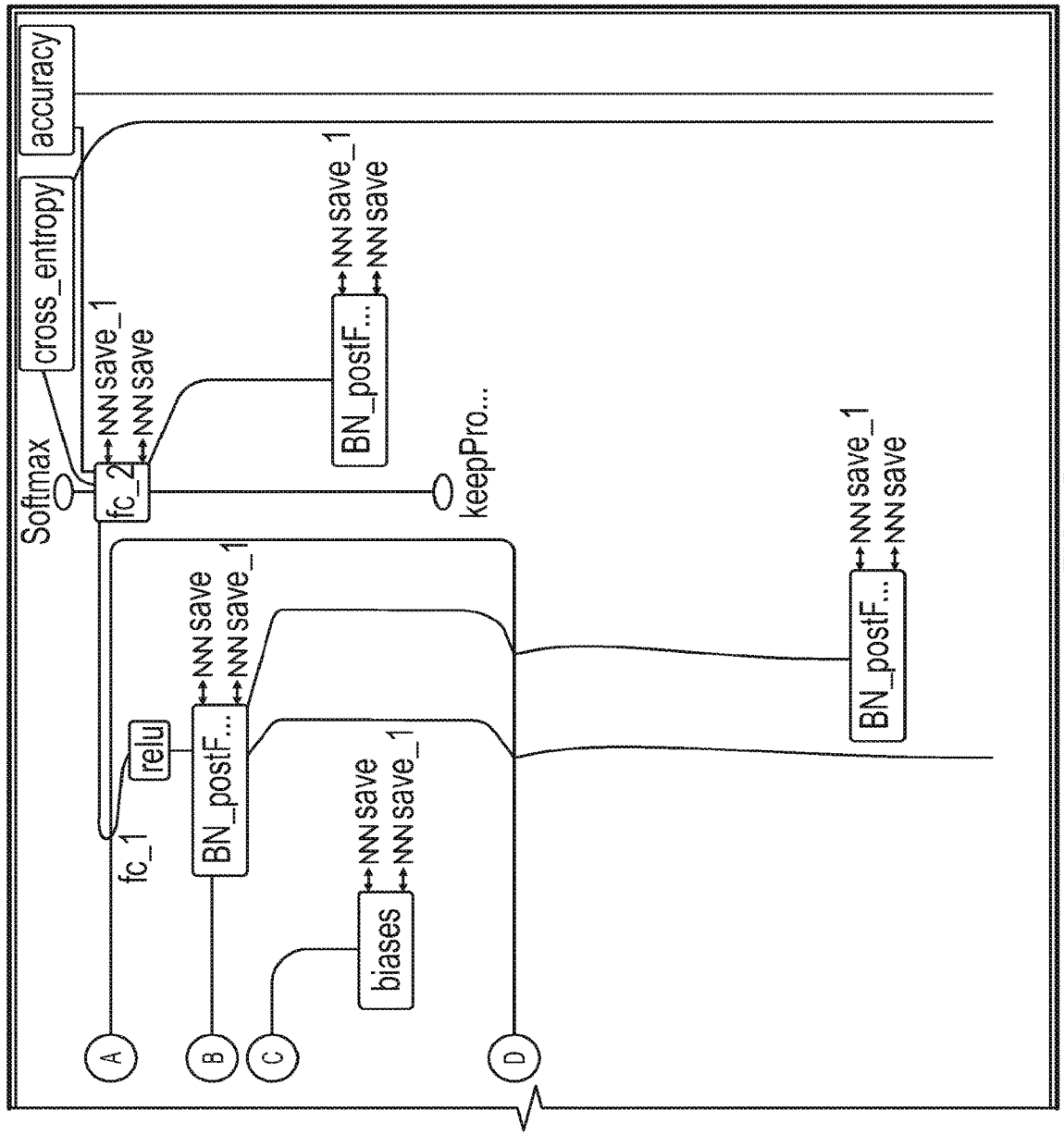

FIGS. 4A-4B illustrate an embodiment of the architecture 400 in Tensflow represented as a graph. FIGS. 5A-5B illustrate 2 layers of the architecture 500. With this model, the accuracy is extremely high. However, the results may be biased depending on training of the model with an outlier set. The bias would occur in cases where the outlier set is too limited, and for example automatically generated. The target model is very specific as to a kind of one-class problem, whereas the outlier class can be considered as all elements outside of the target class.

Selecting/Grouping of Obtained Aerial Images for Processing

An area surveyed or inspected by the UAV may include thousands of aerial images. These digital images include various depictions of the different ground control points. It is very time-consuming and inefficient to manually identify whether an image is a specific ground control point.

To address this inefficiency, the system may segment or group together images that include a depiction of respective ground control points. The system projects the ground control point geo-spatial coordinates into the image coordinates (considering yaw pitch and roll for the projection). For example, the location physical coordinates of GPC_RP_1 are projected into image coordinates. If the projected point is in the image (considering an offset), then this image is selected for this ground control point. Otherwise, it is not use for further treatments. The offset is used, because the topology of the ground may be unknown and also to take address about GPS and metadata errors. The images that pass the criteria, then are included in the set of images that are related to GCP_RP_1. For each of the ground control points, (e.g., GCP_RP_1, GCP_RP_2, GCP_RP_3 and GCP_RP_4) the process is performed to group images into respective datasets. The results of the process would generate grouped sets of images for the respective ground control points.

The system determines whether an image file includes a depiction of a particular ground control point. For example, considering GCP_RP_1, the system will identify those images that likely include a representation of GCP_RP_1. A region of interest can be defined, where the region of interest is used to identify those images that include a depiction of a ground control point in the region of interest.

An embodiment of the grouping/selection process of digital images including a depiction of ground control points is described as follows. A ground size is defined (in meters). To do so, a fly elevation is needed. This fly elevation information may not be available, so the system may use (i) the altitude of the UAV for each image $M_{z_i}$, and (ii) the altitude of the ground for each ground control point $GCP_{zj}$. The fly elevation may be defined and determined by the system using the formulae: $fly_{el_{i,j}} = M_{z_i} - GCP_{z_j}$ This is a necessary approximation. This value is near the truth for images close to the considered ground control point, but may be incorrect for those far from the considered ground control point (since the ground altitude is incorrect). However, given that as the distance to the considered ground control point increases, the less important this inaccuracy becomes, this is an appropriate estimation. The ground size $GS_{\{x,y\}}$ (in meters) can then be defined considering the focal f (in millimeters), the size of the sensor $CCD_{\{x,y\}}$ (in millimeters) and the $fly_{elevation_{i,j}}$ (in meters):

$$scale_{i,j} = f/(fly_{elevation_{i,j}} * 1000)$$

$$GS_{\{x,y\}_{i,j}} = CCD_{\{x,y\}}/(scale_{i,j} * 1000)$$

The estimated position of the ground control point may then be determined considering the orientation (or pose) of the UAV. The orientation of the UAV when the image is obtained may be applied, for example, using the roll, pitch and yaw of the UAV associated with a particular image. This assumes that the UAV has a fixed camera to the UAV. (In other embodiments, information about the orientation or pose of a gimbaled camera may be used). First, considering the meta GPS coordinates as the source and compute or determine a new GCP point, named $G_{new_{\{x,y\}, i,j}}$:

$$G_{new\{x,y\},i,j} = GCP_{\{x,y\},j} - M_{\{x,y\},i}$$

Considering pitch as $P_i$, roll as $R_i$ and yaw as $Y_i$ the angles given by the orientation of the drone for image i in radians.

The system can first apply roll to x coordinate of $G_{new\{x,y\},i,j}$:

$$G_{new,pr_x,i,j} = (G_{new_x,i,j}/\cos(abs(R_i))) + (R_i/abs(R_i))^* (\tan(abs(R_i)))^* \text{fly}_{el_{i,j}}) - G_{new_x,i,j}$$

Then pitch to y coordinate of $G_{new\{x,y\},i,j}$:

$$G_{new,pr_y,i,j} = (G_{new_y,i,j}/\cos(abs(P_i))) - (P_i/abs(P_i))^* (\tan(abs(P_i)))^* \text{fly}_{el_{i,j}}) - G_{new_y,i,j}$$

And applying yaw to both x and y coordinate of $G_{new\{x,y\},i,j}$:

$$\text{offset}_{yaw_x,i,j} = \cos(Y_i)^* G_{new_x,i,j} - \sin(Y_i)^* G_{new_y,i,j}$$

$$\text{offset}_{yaw_x,i,j} = \sin(Y_i)^* G_{new_x,i,j} - \cos(Y_i)^* G_{new_y,i,j}$$

The system can then estimate the geo-position of the ground control point:

$$G_{ypr,geo_{i,j},\{x,y\}} = M_{\{x,y\},i} + \text{offset}_{yaw\{x,y\},i,j} + G_{new,pr\{x,y\},i,j}$$

And convert it in pixels:

$$pix_{offset\{x,y\},i,j} = (G_{ypr,geo_{i,j},\{x,y\}} - M_{\{x,y\},i})/GS_{\{x,y\}i,j}/CCD_{\{x,y\}})$$

$$G_{ypr,pix_{i,j},\{x,y\}} = \text{int}((CCD_{\{x,y\}}/2.0) + pix_{offset\{x,y\},i,j} + 0.5)$$

The system determines an estimation/projection of the ground control point coordinates into each image. By defining a search area (e.g., a region of interest) (considering the error associated with UAV GPS measurement, and also handling unknown topology in the images), the system can (i) select or identify digital images of interest for each ground control point, and (ii) define a region of interest inside those digital images to reduce the area of search. This part of the process would identify those images, for example creating a list of the path and file name of selected digital images. The detection process for each selected image of each ground control point may then be performed on these selected digital images.

In the following sections, consider that the treatment of each ground control point is independent. The detection and the center definition are performed image by image, post processing is performed considering all detections for a respective ground control point.

Center Point Detection and Center Definition

The grouped sets of images for the respective ground control points are processed utilizing the deep learning model. For example, assume that 10 images were identified by the grouping process described above. This group would include a set of images that include a particular ground control point, for example ground control GCP_RP_1. The deep learning model would analyze each of the images in this first group, and determine pixel coordinates for the center of the ground control point depicted in each of the images in this first group. The system would perform the analysis for each subsequent group of ground control point images. For example, the system would perform the center point detection for the group of images associated with respective ground control points, GCP_RP_2, GCP_RP_3, GCP_RP_4, etc.

The system may use a patch-based approach to evaluate pixels of the image to determine whether or not the pixel is the center of a ground control point. The patch-based approach includes creating a pixel cluster for each of the pixels, and evaluating whether the pixel cluster includes a target and is the middle of the target. In other words, for each pixel of an image, a pixel cluster is defined around the pixel, and evaluated.

The system determines a score for a cluster of pixels in a digital image. For example, the system evaluates a pixel cluster of a certain size, for example a 28 by 28 pixel cluster. This pixel cluster may also be referred to as a sub-image, or as a pixel area that is part of the primary digital image. The system determines whether or not the pixel cluster includes a target (i.e., a ground control point), and whether the middle of the pixel cluster is the middle of the target. In one embodiment, the system determines for the pixel cluster, a score, such as 0 or 1 value. A score of 1 indicates that the pixel cluster includes a target and the middle of the pixel cluster is the middle of the target. While in the described embodiment, the score is a Boolean score, the score may describe the pixel in terms of probability or likelihood that the pixel is a target, and the pixel is the middle of a target. The system uses the scoring to indicate that the evaluated pixel cluster has found or likely has found with a high degree of certainty such, as >99%, the center of a ground control point.

The system uses the trained model on each pixel of the region of interest defined for each ground control point selected image (each pixel means each 28 by 28 window centered around that pixel). The model gives a score representing the likelihood of the pixel being a target $S_T$ or an outlier $S_o$ (between 0 and 1, note that $S_T + S_o = 1$). To be more precise, considering the definition of the training database, the model gives a score representing the likelihood that the pixel is the center of a target or an outlier.

However, it is very computationally expensive to evaluate every pixel in an image. To reduce the number of computations, thereby increasing processing efficiency, the targets may be identified using a two-phase approach.

In the first phase, the system uses an offset n, meaning testing one pixel over n. In one embodiment, the offset is set as n=4. For each answer of the model (even a low answer, such as $S_T >= 0.001$), the pixel is marked has "to be tested". Note that the choice of selecting even low answers is explained by the choice of model used for center detection: the score is not high if considered pixel is not the center of the target. The value n may be increased or decreased in value.

The system in the second phase uses the answers obtained from the first phase. The same model is used again for all pixels considering a neighborhood of size n-1. At this time, the system is identifying or looking for really high answers of the model (meaning $S_T >= 0.99999$), and mark all accepted pixels as a target.

To define a subpixellar center of a target, the system uses the shape created by the positive answers of the second phase. The center of the target may be defined by the gravity center of this shape. The pixel coordinates of the image for the center of the target are identified and are associated with the geo-spatial coordinates of the ground control point.

To further assist in obtaining accurate pixel center determination, the particular results may be compared using histogram comparison. Metrics that may be used are correlation, intersection, Manhattan distance, and Chebyshev distance. These criteria help eliminate false targets.

Subsequent Processing. The system may optionally include different levels of post processing: an image level, a ground control point level and a site level. The system may include one or more, or a combination of these subsequent post-processing analysis. The purposes of the image level and the ground control point level are the same: avoiding false positives in the detection, which is important for later photogrammetric processing. The objective of the site level is different: if several ground control points are close to one another, for example two ground control points are physically located in proximity to one another, it is possible the incorrect ground control point may be identified. For, example the wrong target is linked to a ground control point, even with the use of a region of interest. This can happen for example, if an aerial image includes a depiction of two or more ground control points in the image. This is also important for the photogrammetric process and should be address to avoid errors in processing.

Image level. The image level post processing relies on the fact that considering one image for one ground control point, only one target has to be detected. Knowing that, if several answers are given by the model, the idea is to select the best one, considering these criteria: (i) the group of answers with the best score, (ii) the biggest group with the best score, (iii) the nearest group of the pixel estimation of the ground control point position. All other answers are not used. This image level process may then determine the likely target to be used where the aerial digital image includes a depiction of two or more ground control points in the image.

GCP level. The ground control point level post processing provides additional benefits to the image processing. Knowing that the problem is close to a one-class problem (in the case of a I pattern ground control point, the situation is targets against all other things), and that the training database cannot represent this "all other things" in a satisfactory manner, it follows that (i) the score of the model is quite binary, and (ii) the model can yield some false positives. For instance, two nearby rocks with a high UAV altitude on a blurred image can look like a blurred target. This post processing level has to handle these wrong answers, by comparing all results and finding outliers.

For each possible target $t \in T$, two normalized histograms are computed, on the 28 by 28 windows, named $H_{t_{loc}}$, and on a bigger window (with more context), of size 201 by 201 pixels, named $H_{t_{cont}}$. A score is then computed for each target $t \in T$ considering all other targets $u \in T-\{t\}$, taken into account:

The maximum score and the number of answers given by the model.

The correlation between histograms may be defined by:

$$d_{Co_t}(H_{t_{\{loc,cont\}}}, H_{u_{\{loc,cont\}}}) = \frac{\sum_I (H_{t_{\{loc,cont\}}}(I) - \overline{H}_{t_{\{loc,cont\}}})(H_{u_{\{loc,cont\}}}(I) - \overline{H}_{u_{\{loc,cont\}}})}{\sqrt{\sum_I (H_{t_{\{loc,cont\}}}(I) - \overline{H}_{t_{\{loc,cont\}}})^2 \sum_I (H_{u_{\{loc,cont\}}}(I) - \overline{H}_{u_{\{loc,cont\}}})^2}}$$

With (N is the total number of histogram bins):

$$\overline{H}_{(ut)_{\{loc,cont\}}} = \frac{1}{N} \sum_J \overline{H}_{(ut)_{\{loc,cont\}}}(J)$$

The intersection between histograms may be defined by:

$$d_{Int}(H_{t_{\{loc,cont\}}}, H_{u_{\{loc,cont\}}}) = \Sigma_I \min(H_{t_{\{loc,cont\}}}(I), H_{u_{\{loc,cont\}}}(I))$$

The chebyshev distance between histograms may be defined by:

$$d_{Ch_t}(H_{t_{\{loc,cont\}}}, H_{u_{\{loc,cont\}}}) = \max_I |H_{t_{\{loc,cont\}}}(I) - H_{u_{\{loc,cont\}}}(I)|$$

The City Block (Manhattan) distance between histograms may be defined by:

$$d_{CB_t}(H_{t_{\{loc,cont\}}}, H_{u_{\{loc,cont\}}}) = \sum_I |H_{t_{\{loc,cont\}}}(I) - H_{u_{\{loc,cont\}}}(I)|$$

These metrics allow the system to detect values which deviate from the standard, by considering model answers and histogram comparisons, and so remove false positives. Note that false positives are important for the photogrammetric process, criteria are restrictive and some good answers can be removed by this step.

Site level. When all ground control points are treated, it is possible that some confusion occurs if ground control point are close to one another. For example, a particular image may include a representation of two ground control points. A final post processing may be performed after the center point detection process is completed. The same target may have been detected for two ground control points on the same image. By converting the pixel estimated position into an estimated geo-position, the system may compute the distance to the considered ground control point. The result is that the system attributed or assigns the center point, or pixel coordinates, to the closest ground control point.

Generated Output

The system may generate various output that may be used for subsequent processing of the digital images obtained by the UAV. For example, a dataset may be generated with each line of the dataset or file corresponding to a particular ground control point name/identifier, the geo-spatial position of the ground control point ('gcp,' 'easting', 'northing' and 'altitude'), the path of the image ('image') and the sub-pixellar position of the target in the image ('xcoord' and 'ycoord'). The following table describes an exemplary output of the process.

TABLE 3

| GCP_Name | Easting | Northing | Altitude | Image | Xcoord | Ycoord |
| --- | --- | --- | --- | --- | --- | --- |
| GCP RP 1 | 289310.30303413805 | 172635.13543768934 | 31.196 | path/IMG_6445.JPG | 3071.6 | 28.04 |
| GCP RP 1 | 289310.303413805 | 172635.13543768934 | 31.196 | path/IMG_6446.JPG | 2436.44 | 1493.6 |
| GCP RP 1 | 289310.303413805 | 172635.13543768934 | 31.196 | path/IMG_6447.JPG | 2427.862068965517 | 2676.72413793310344 |
| GCP RP 2 | 289255.4421706536 | 172709.20264107193 | 32.333 | path/IMG_6448.JPG | 594.64285714258571 | 1690.7857142857142 |
| GCP RP 2 | 289255.4421706536 | 172709.20264107193 | 32.333 | path/IMG_6449.JPG | 496.0 | 2858.285714285714 |
| GCP RP 2 | 289255.4421706536 | 172709.20264107193 | 32.333 | path/IMG_6450.JPG | 2308.24 | 822.96 |

In Table 3, the field GCP_Name is the identifier for a particular ground control pint. The Easting, Northing and Altitude Values are the Easting and Northing values found in Table 1. The Xcoord and the Ycoord values represent the pixel coordinates of the center of the ground control point found in the respective images. The pixel coordinate identifies the location of a pixel in the image. As shown in Table 3, the original measured location and altitude of a particular ground control point repeats. An image file identifier (optionally with a described particular path), and the identified x/y pixel coordinate is generated. The x/y coordinate represents the pixel location in the image for the identified center of the ground control point in the image.

While an example file output is described above, the system may provide the pixel coordinate of the center of the ground control points directly to photogrammetric processing using application programming interfaces, and function calls, and the information provided to other system processes, or exported into memory, a database or a file to be used in subsequent photogrammetry processing.

The system may perform photogrammetry processing, and/or execute software tools, such as Agisoft PhotoScan or Pix4d, using the identified pixel location of the ground control points in each of the images. The representative data may be in the various forms, for example a database file, a delimited file using a particular character to delimit the field values.

In alternative embodiments, the ground control points used for an inspection, may each have a unique pattern displayed on the ground control point. The machine learning algorithm may be trained with images for each of the unique patterns. The machine learning algorithm, then may automatically identify a particular grouping of images based on the unique pattern of the ground control point. By doing so, the images may be grouped or segmented by the particular pattern of the identified ground control point.

Considering the image grouping, in one embodiment the ground altitude of each ground control point is used as a source to compute the height of flight for each image. This could include interpolating values in each position by considering all ground control point of the site. This would improve the accuracy of the selection of images, and allow reduction in the size of the region of interest in each image.

In one embodiment, the first phase of the detection process could be replaced by training a segmentation model, which would increase overall processing time. This would include the creation of a new training database and the definition of a new architecture for the model (following the lead of FCN architecture: [Long, Jonathan, Evan Shelhamer, and Trevor Darrell. "Fully convolutional networks for semantic segmentation." *Proceedings of the IEEE Conference on Computer Vision and Pattern Recognition*. 2015.] or SegNet architecture: [Badrinarayanan, Vijay, Alex Kendall, and Roberto Cipolla. "Segnet: A deep convolutional encoder-decoder architecture for image segmentation." *arXiv preprint arXiv:* 1511.00561 (2015).]). The use of such a model would allow removal of the GCP level of post-processing.

If the segmentation model does not allow removal of the ground control point level of post-processing, in one embodiment a model could be created which detect targets (and not only the center of targets) by adding translation variability into the training database. The model would allow for the determination and deletion of false positives during the detection phase.

Adding a quality metric on the detection of targets. On one hand, detecting all targets is not really useful for the photogrammetric process (between 10 and 15 is enough, even if 40 images with a target for a ground control point are available). On the other hand, detecting the center of a blurred target is not good for the accuracy of the photogrammetric process. In another embodiment, a quality metric may be associated with the images (and in particular on the target part) and keep blurred images only if it is needed (not enough images for the ground control point). The images can be analyzed by the system to determine if an image passes or meets a quality level or a threshold level. For example, the system may determine that the image is blurry, for example by analyzing the Fourier transform and determining frequencies present in the image. A particular threshold level may be set, where if the image does not pass the criteria, then the image is excluded from processing. For example, the system may determine a quality score of the image, and discard or not analyze the image for determining a pixel coordinate if the quality score does not a threshold value.

Various types of UAVs may be used to implement the inventions described herein (for example, a fixed wing airplane, helicopter, a multi-rotor vehicle (e.g., a quadcopter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A computing apparatus comprising:
   one or more computer-readable storage media; and
   program instructions stored on the one or more computer-readable storage media that, when executed by one or more processors, direct an aerial vehicle to a least:
   segment digital images obtained by the aerial vehicle into one or more groups corresponding to one or more ground control point depicted in the digital images;
   identify a center location of a ground control point in a particular digital image of at least one of the one or more groups; and
   determine a pixel coordinate of the center location of the ground control point.

2. The computing apparatus of claim 1, wherein the program instructions, when executed by the one or more processors, are further configured to direct the aerial vehicle to:
   generate a dataset including the pixel coordinate identifying the center location of the ground control point in the particular digital image.

3. The computing apparatus of claim 1, wherein the program instructions, when executed by the one or more processors, are further configured to direct the aerial vehicle to:
   associating the determined pixel coordinate with a geo-spatial location of the ground control point.

4. The computing apparatus of claim 1, wherein at least one digital image of the digital images has an associated geo-spatial coordinate indicating a location of where the digital image was captured by the aerial vehicle.

5. The computing apparatus of claim 1, wherein at least one digital image of the digital images has an associated yaw, pitch, and roll value of the aerial vehicle at the time when the aerial vehicle captured the digital image.

6. The computing apparatus of claim 1, wherein the program instructions, when executed by the one or more processors, are further configured to direct the aerial vehicle to:
   generate a geo-rectified 3D model, or composite image, based on the digital images using the pixel coordinate.

7. The computing apparatus of claim 1, wherein the program instructions, when executed by the one or more processors, are further configured to direct the aerial vehicle to:
   determine a quality score associated with the particular digital image; and
   discard the particular digital image from determining a pixel coordinate if the quality score does not meet a threshold value.

8. A method comprising:
   segmenting digital images obtained by an aerial vehicle into groups corresponding to one or more ground control points depicted in the digital images;
   identifying a center location of a ground control point in a particular digital image of at least one of the groups; and
   determining a pixel coordinate of the center location of the ground control point.

9. The method of claim 8, further comprising:
   generating a dataset including the pixel coordinate that identifies the center location of the ground control point in the particular digital image.

10. The method of claim 8, further comprising:
    associating the determined pixel coordinate with a geo-spatial location of the ground control point.

11. The method of claim 8, wherein at least one digital image of the digital images has an associated geo-spatial coordinate indicating a location where the digital image was captured by the aerial vehicle.

12. The method of claim 8, wherein at least one digital image of the digital images has an associated yaw, pitch, and roll value of the aerial vehicle at the time when the aerial vehicle captured the digital image.

13. The method of claim 8, further comprising:
    generating a geo-rectified 3D model, or composite image, based on the digital images using the pixel coordinate.

14. The method of claim 8, further comprising:
    determining a quality score associated with the particular digital image; and
    discarding the particular digital image from determining a pixel coordinate if the quality score does not meet a threshold value.

15. An aerial vehicle comprising:
    a processing system configured to:
    segment digital images obtained by the aerial vehicle into groups, wherein a group includes digital images for a particular control point;
    identify a center location of a ground control point in a particular digital image; and
    determine a pixel coordinate of the center location of the ground control point.

16. The aerial vehicle of claim 15, wherein the processing system is further configured to:
    generate a dataset including the pixel coordinate identifying the center location of the ground control point in the particular digital image.

17. The aerial vehicle of claim 15, wherein the processing system is further configured to:
    associate the determined pixel coordinate with a geo-spatial location of the ground control point.

18. The aerial vehicle of claim 15, wherein at least one digital image of the digital images has an associated geospatial coordinate indicating a location of where the digital image was captured by the aerial vehicle.

19. The aerial vehicle of claim 15, wherein at least one digital image of the digital images has an associated yaw, pitch and roll value of the aerial vehicle at the time when the aerial vehicle captured the digital image.

20. The aerial vehicle of claim 15, wherein the processing system is further configured to:
   generating a 3D surface model, or a composite image, based on the digital images using the pixel coordinate.

* * * * *